Oct. 28, 1952 W. Q. SULLIVAN ET AL 2,615,257
ARC FORMING FLEXIBLE RULER
Filed July 26, 1947 7 Sheets-Sheet 1

INVENTORS
WILLIAM Q. SULLIVAN
JOHN Q. SULLIVAN
By Hazard+Miller
ATTORNEYS

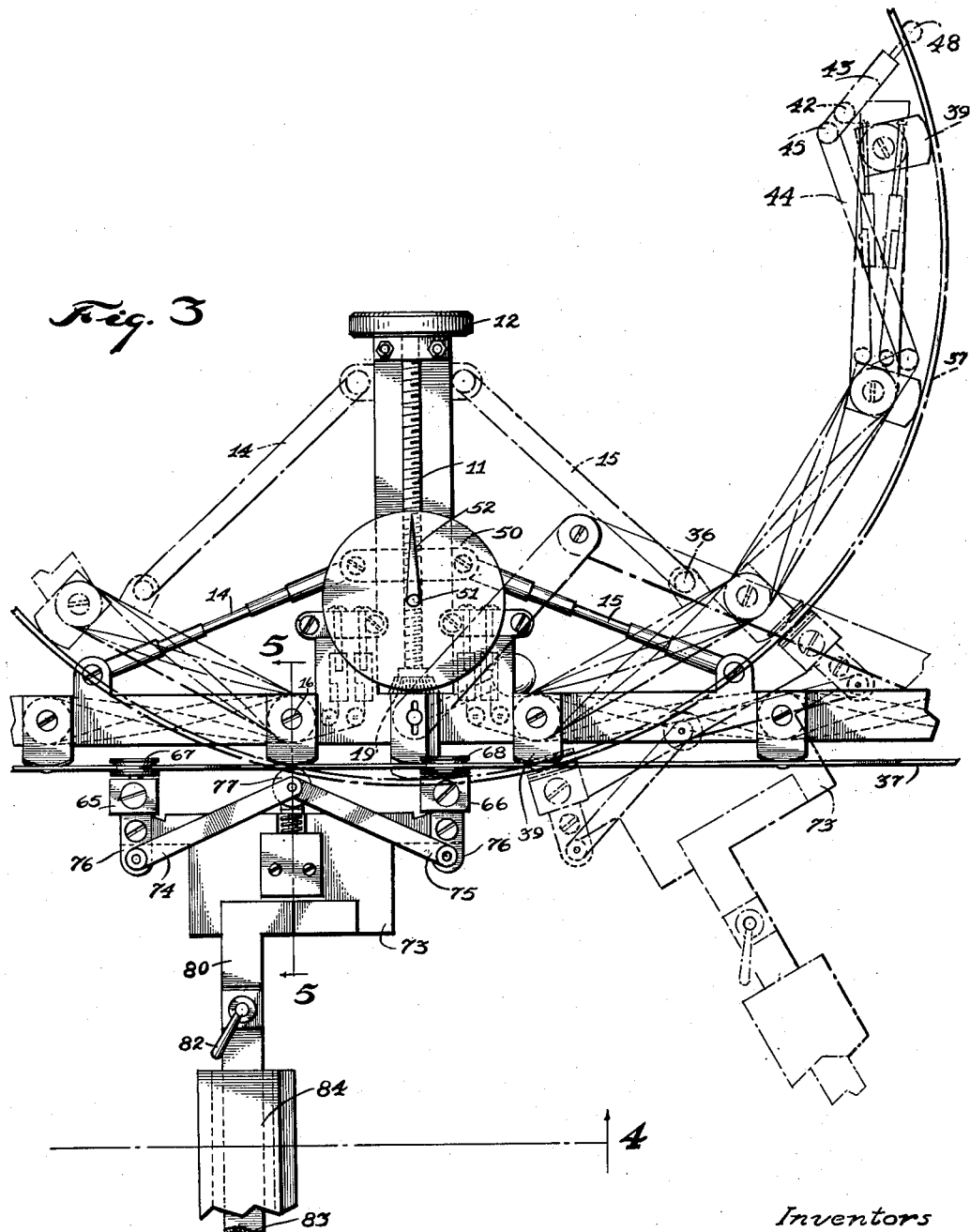

Oct. 28, 1952 W. Q. SULLIVAN ET AL 2,615,257
ARC FORMING FLEXIBLE RULER
Filed July 26, 1947 7 Sheets-Sheet 3
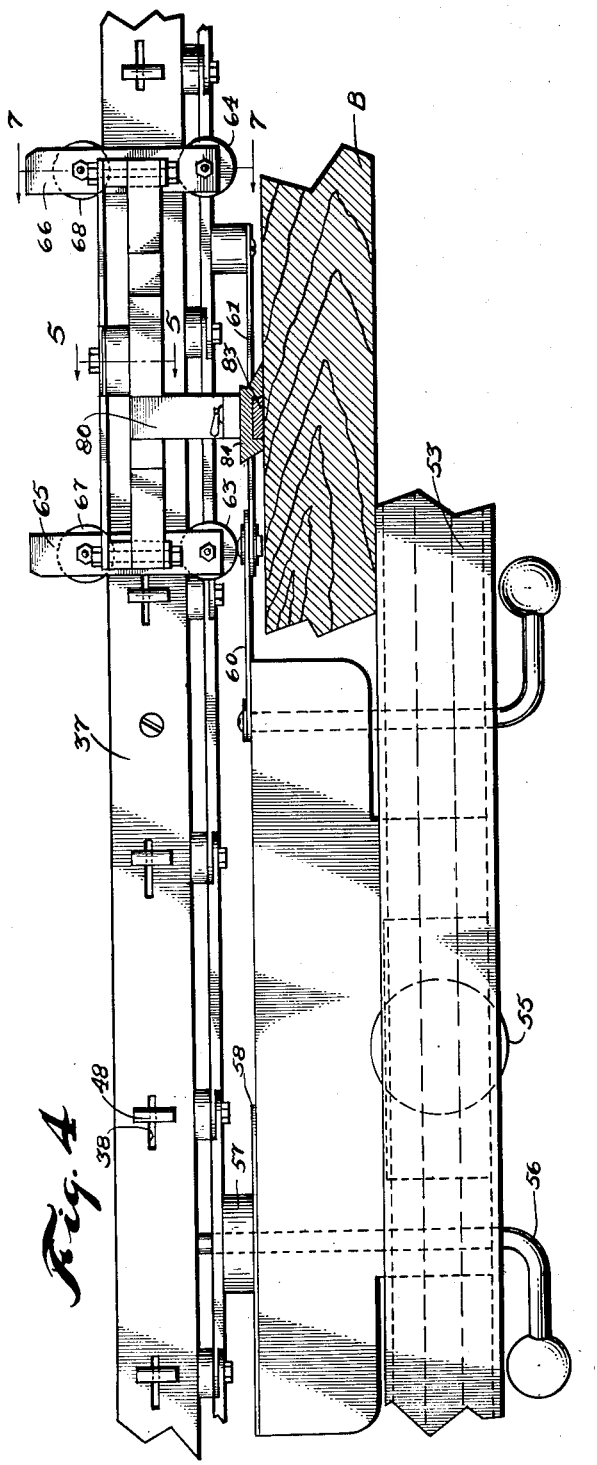
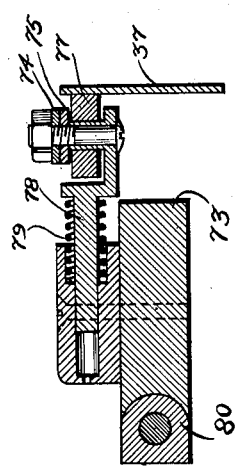
INVENTORS
WILLIAM Q SULLIVAN
JOHN Q SULLIVAN
By Hazard & Miller
ATTORNEYS

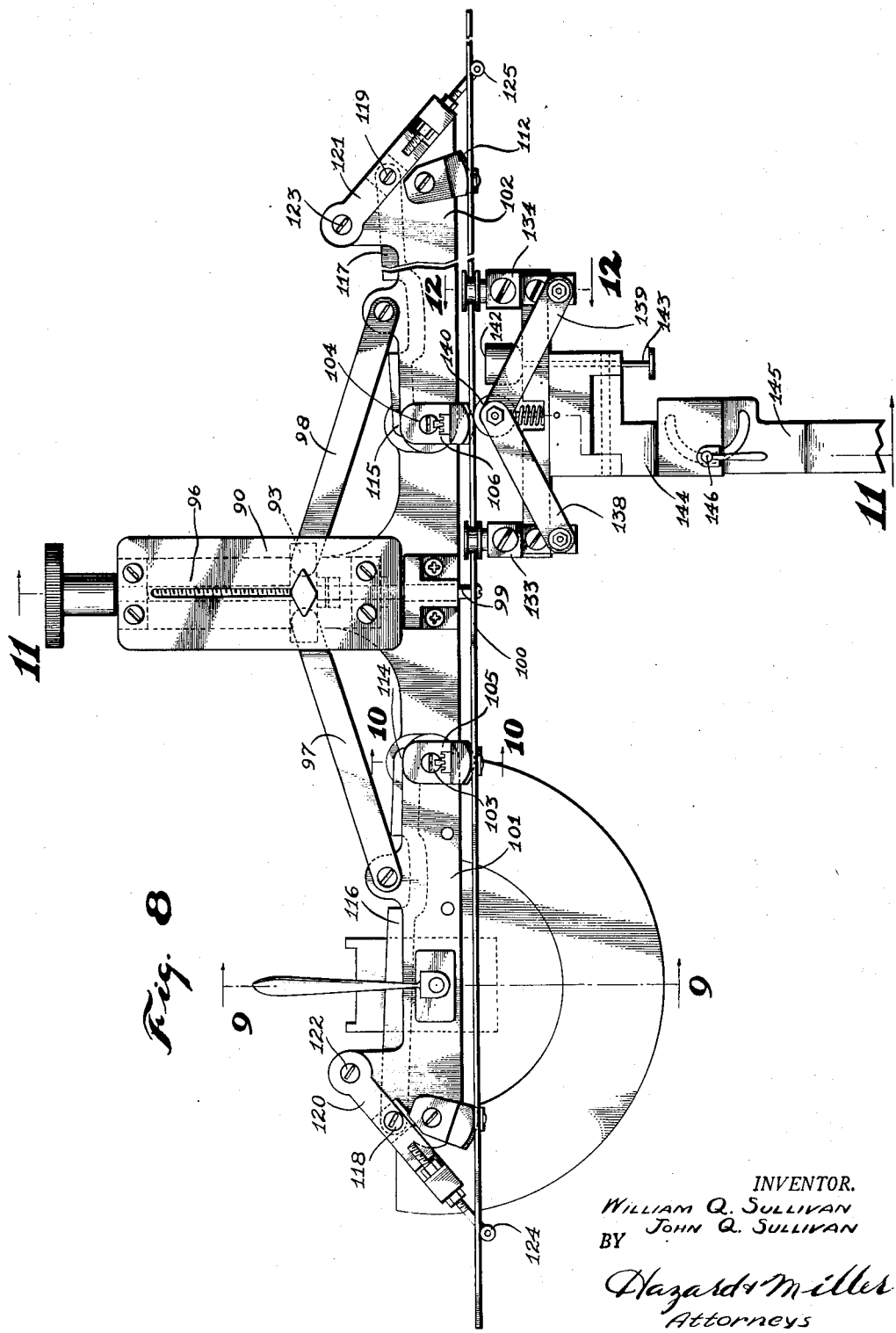

Oct. 28, 1952 W. Q. SULLIVAN ET AL 2,615,257
ARC FORMING FLEXIBLE RULER
Filed July 26, 1947 7 Sheets-Sheet 6
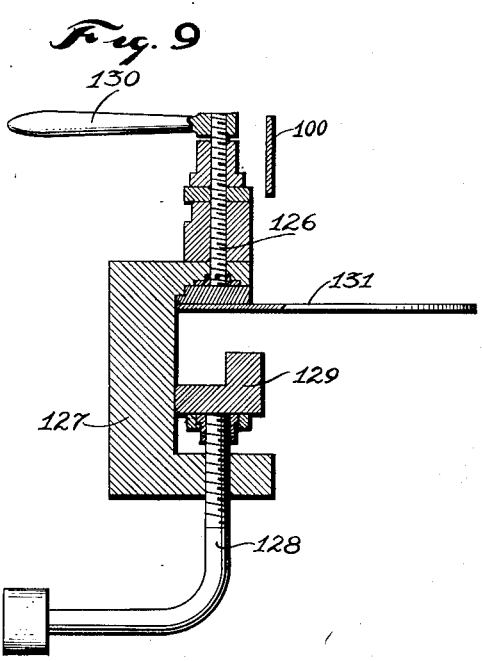
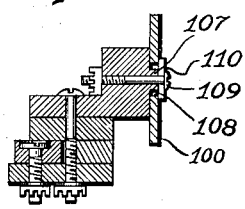
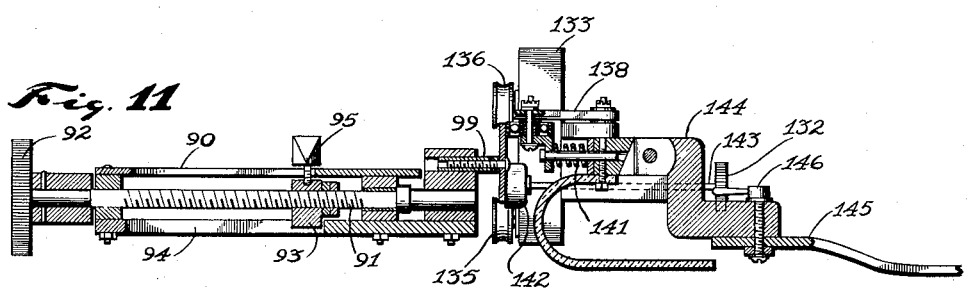
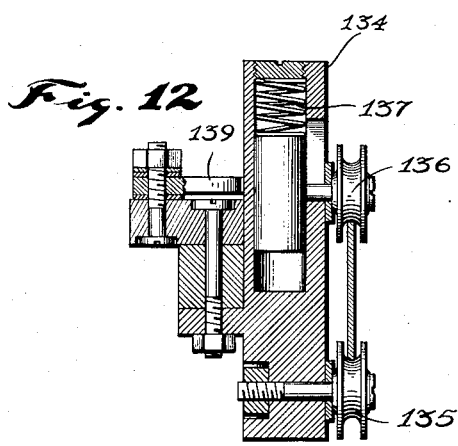
INVENTOR.
WILLIAM Q. SULLIVAN
JOHN Q. SULLIVAN
BY
Hazard & Miller
Attorneys

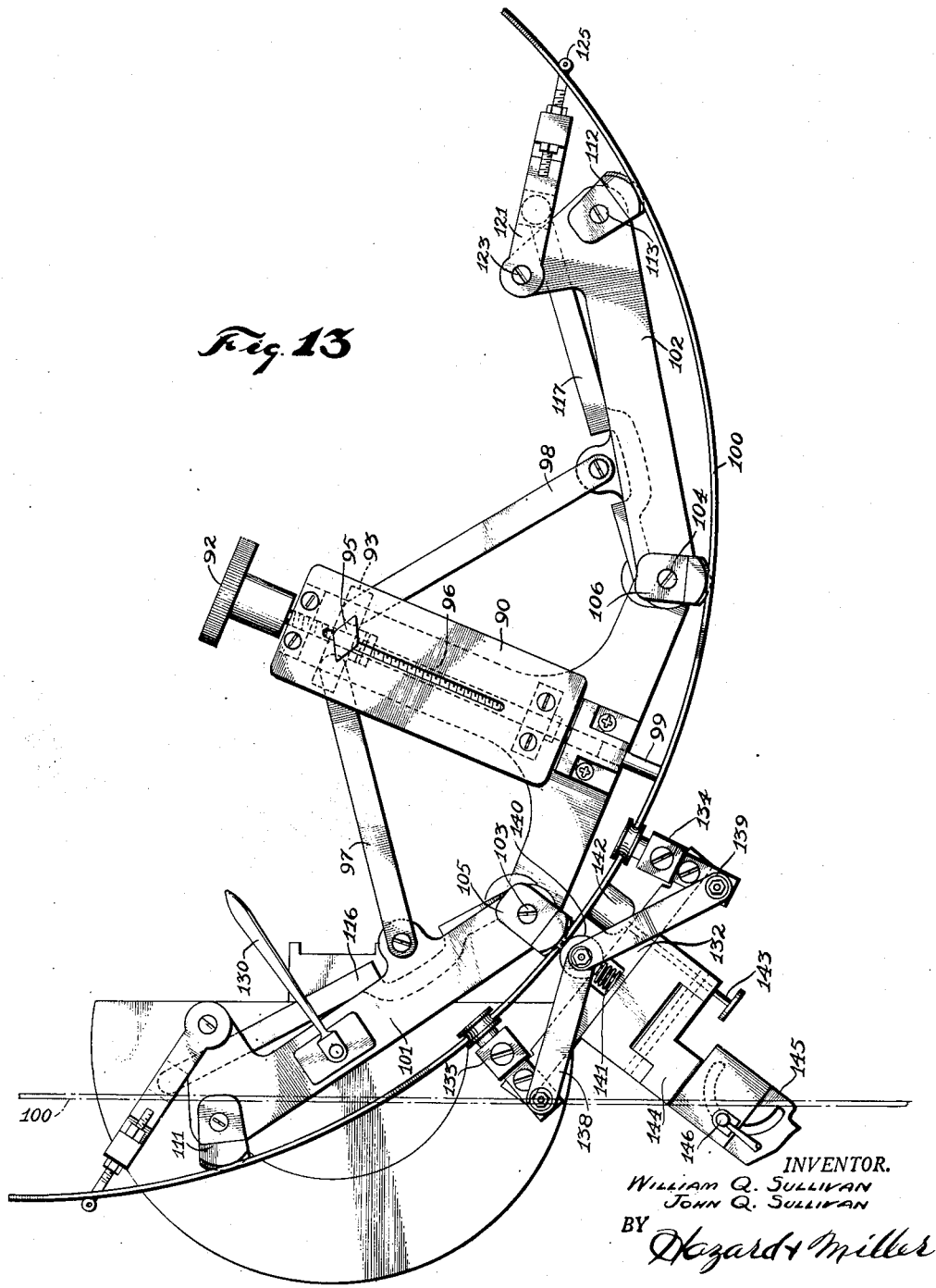

Patented Oct. 28, 1952

2,615,257

UNITED STATES PATENT OFFICE 2,615,257

ARC FORMING FLEXIBLE RULER

William Q. Sullivan, North Hollywood, and John Q. Sullivan, Ocean Park, Calif.

Application July 26, 1947, Serial No. 763,846

3 Claims. (Cl. 33—177)

This invention relates to improvements in drafting implements, and concerns a novel beam compass and a perspective machine.

A primary object of the invention is to provide a novel construction that may be advantageously employed as a beam compass to enable the drawing of arcs of circles having extremely long radii that may approach infinite distances, in which case the arc drawn is merely a straight line.

Another object of the invention is to provide a drafting implement that may be used as a beam compass to draw arcs having very long radii and which is so constructed as to indicate with reasonable accuracy the radius of the arc to which the device is adjusted so that the construction can be used not only to draw an arc of a specified radius, but also to determine the radius of a drawn arc to which the device may be fitted.

More specifically, an object of the invention is to provide a drafting implement consisting of a body or frame to the ends of which links are pivotally connected and which have additional or secondary links pivotally connected thereto with means for swinging the first-mentioned or primary links equally with relation to the body or frame and causing the secondary or additional links to automatically be swung relatively to the primary links through exactly equal angles. The device also comprises a bendable spline that is held against spaced bearing points adjacent the pivotal connection and which is deformed thereby into conformity with the arc of a true circle, thus providing a relatively compact, simple, and easily adjustable device for drawing arcs.

Another object of the invention is to provide a drafting implement having the above-mentioned characteristics wherein a novel means is provided at the ends of the outermost links for retaining the bendable spline against the bearing points thereon and which automatically will properly bend the spline adjacent its ends, so as to conform to the arc of a circle.

Another object of the invention is to provide a drafting implement that may be advantageously employed in drawing perspectives wherein a device suitable for use as a beam compass is utilized to provide an arcuate track that will guide the movement of a rule. The rule thus guided and functioning as a T-square will traverse an adjustable arcuate path instead of a linear path as in the case of a conventional T-square. By adjusting the degree of curvature the location of the vanishing point of the perspective may be varied and other adjustments are provided for properly locating the device in drawing various perspectives.

Still another object of the invention is to provide a perspective machine having an adjustable arcuate guide means traversed by a rule and wherein means is provided for automatically adjusting the connection between the rule and the guide means to facilitate movements regardless of alterations in the degree of curvature of the guide.

With the foregoing and other objects in view, which will be made manifest in the following detailed description and specifically pointed out in the appended claims, reference is had to the accompanying drawings for an illustrative embodiment of the invention, wherein:

Fig. 3 is a view similar to Fig. 1, but illustrating in dotted lines the position assumed by the various parts in forming an arc of a circle. This view also illustrates the device as having been converted into a perspective machine by the application of a rule thereto;

Fig. 4 is a view in elevation, parts being shown in vertical section taken substantially in the direction of the arrow 4 upon Fig. 3;

Fig. 5 is a sectional view taken substantially upon the line 5—5 upon Fig. 3;

Fig. 8 is a view similar to Fig. 3, but illustrating an alternative form of construction;

Fig. 9 is a sectional view taken substantially upon the line 9—9 upon Fig. 8;

Fig. 10 is a sectional view taken substantially upon the line 10—10 upon Fig. 8;

Fig. 11 is a sectional view taken substantially upon the line 11—11 upon Fig. 8;

Fig. 12 is a sectional view taken substantially upon the line 12—12 upon Fig. 8;

Fig. 13 is a partial top plan view of the perspective machine illustrated in Fig. 8 and illustrating the spline thereof as having been bent or curved.

Figure 1:
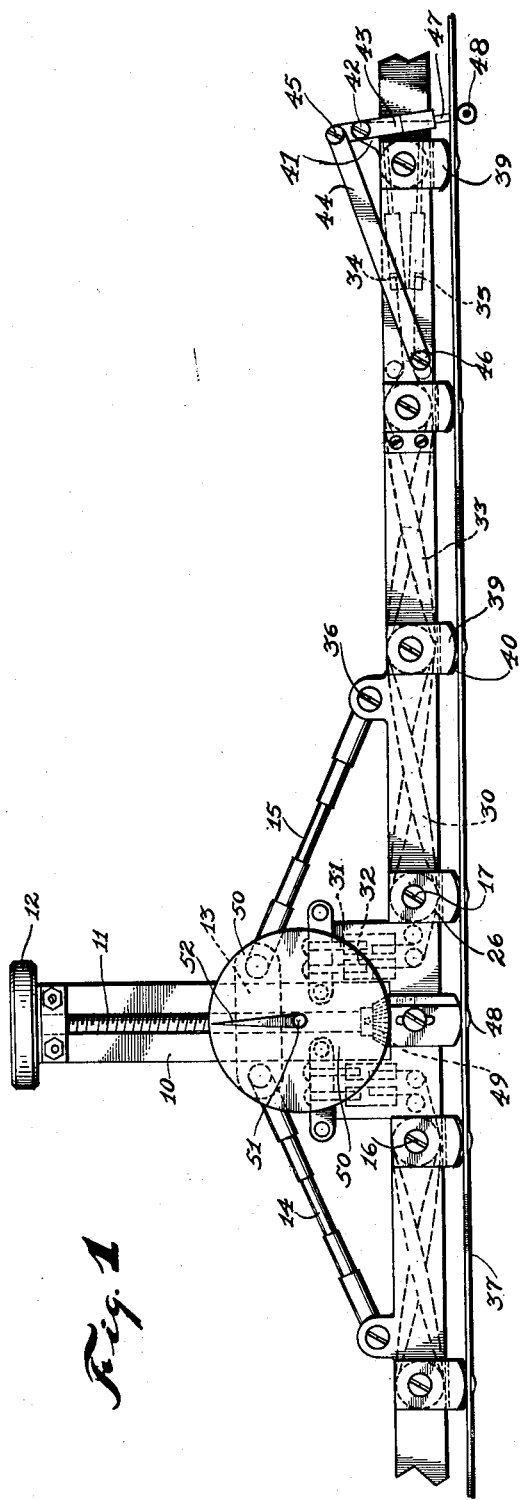
Figure 1 is a top plan view of a little more than one-half of a drafting implement embodying the present invention which is suitable for use as a beam compass.
Figure 2:
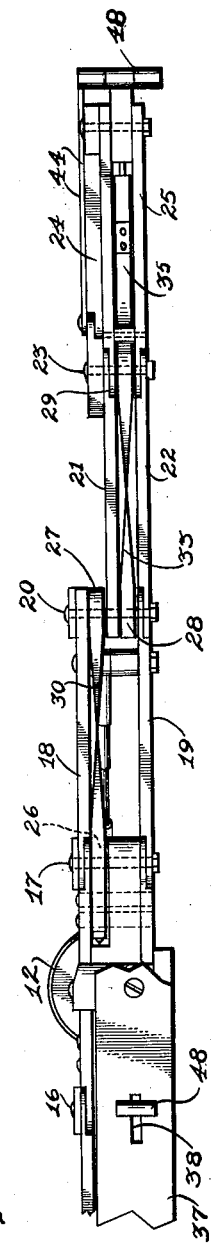
Fig. 2 is a view in front elevation of the same, parts being broken away.

Referring to the accompanying drawings wherein similar reference characters designate similar parts throughout, and referring first to that simplified form of construction suitable for use as a beam compass, this form is only partially illustrated in Figs. 1 and 2 inasmuch as both sides or ends of the device are identical. It consists of a frame or body 10 of general T-shaped formation. At the center of this body there is rotatably mounted a screw 11 rotatable by means of a handle 12. The screw is threaded through a nut or yoke 13 that is slidably mounted on the body 10 and which has arms 14 and 15 pivotally connected thereto. Near each end of the body there are pivots 16 and 17 which serve to pivotally connect innermost or primary pairs of links to the frame or body 10. Thus the pivot 17 has links 18 and 19 connected thereto and the pivot 16 serves to pivotally connect a corresponding pair of links. The outer ends of the links 18 and 19 are connected together by a pivot pin 20 which serves to pivotally connect a pair of outer or additional links 21 and 22 to the links 18 and 19 for swinging movement relatively thereto. These links, in turn, have their outer ends connected by a pivot pin 23 which serves to pivotally connect thereto a pair of endmost links 24 and 25.

A circular hub 26 is disposed about the pivot 17 and similar circular hub 27 is disposed about the pivot 20 so as to be rigid with the link 21. Another circular hub 28 is disposed about the pivot pin 20 and is anchored or rendered rigid with the link 19. The pivot pin 23 carries a circular hub 29 disposed between the links 21 and 22 and which may be rigid with either or both of the links 24 and 25. Steel ribbon 30 is trained about the hubs 26 and 27 as indicated in dotted lines on Fig. 1. This ribbon has its ends anchored on the frame 10, such as is indicated at 31 and 32. The anchoring means is preferably adjustable so as to take up any slack in the ribbon as it is essential that the ribbon be maintained taut at all times. In a similar manner, a ribbon 33 is trained about the hubs 28 and 29 and has its ends anchored on the outermost path of links 24 and 25 such as by anchoring means 34 and 35 which are likewise adjustable to take up slack. As will be observed from the drawing that end of the ribbon 31 which is trained over the forward side of hub 26 is twisted and passed therefrom about the rearward side of the hub 27 and after passing around this hub the ribbon is again twisted and passed against the rear side of hub 26 and is finally anchored at 32. In a similar manner that end of ribbon 33 which is anchored at 35 passes across the forward side of hub 29, is then twisted, and trained about the hub 28 after which it is again twisted before passing against the rear side of hub 29 and anchored at 34.

The arm 15 carries at its forward end a pivot pin 36 that extends through eyes on the rear sides of the links 18 and 19 and in a similar manner arm 14 carries a pivot pin that extends through corresponding eyes on the links attached to the pivot pin 16.

On rotation of the handle 12 to turn the screw 11 the nut or yoke 13 will be advanced either forwardly or rearwardly with relation to the body 10 to simultaneously push or pull on the arms 14 and 15. If the arms 14 and 15 are pulled from the position shown in Fig. 1 rearwardly, this will cause the pair of links attached to the body 10 by the pivot pin 17 to swing relatively to the body and the pair of links that are pivoted at 16 will be caused to simultaneously swing through an equal angle with relation to the body. During this swinging movement the ribbon 30 will be caused to wind around the forward side of the hub 26 and at the same time that reach of the ribbon bearing against the rear side of the hub 26 will commence to unwind therefrom. In this manner, there will be a relative movement between the two crossed and twisted reaches between the hubs 26 and 27 that will be effective on the hub 27 tending to turn this hub with relation to the pivot pin 20. As the two hubs 26 and 27 are of equal diameter the extent to which the hub 27 is rotated about the pivot pin 20 relative to the links 18 and 19 is exactly equal in amount to the extent to which the ribbon 30 has altered its position with relation to the hub 26. Consequently, if the links 18 and 19 are turned about the pivot pin 17 relative to the body 10 through an angle of 5° for example the hub 27 will simultaneously be caused to rotate relative to the pivot pin 20 through 5°. As the hub 27 is integral or rigid with the link 21 this link will be caused to swing 5° with relation to the links 18 and 19 thus swinging a hub 29 about the center of pivot pin 20. During this swinging movement of the hub 29 the ribbon 33 bearing against the forward side of hub 28 tends to wrap or wind up about this hub and that portion of the ribbon bearing against the rear side of the hub 28 will tend to unwind therefrom, it being borne in mind that hub 28 is rigid with the link 19. This wrapping of the ribbon 33 on the forward side of hub 28 and its unwrapping from the rear side thereof is translated through the crossed and twisted reaches to the hub 29 so that this hub is likewise caused to rotate through the same 5° angle with relation to the links 21 and 22, thus swinging links 24 and 25 through a 5° angle about pin 23 as a center relative to the links 21 and 22. While this relative movement between the various pairs of links is taking place on the right-hand side of the body 10 the corresponding pairs of links which are to the left of the pivot pin 16 are likewise being caused to shift relatively to each other in a similar manner so that whenever the handle 12 is rotated the innermost or primary links attached to the body 10 by the pivots 16 and 17 will be swung through the same angle and that the additional links or secondary links that are pivoted at 20 and 23, respectively, will be simultaneously and accurately swung through the same angle with relation to their pivots. The spacing of the various pivots is equal. That is, the distance between the pivots 16 and 17 is equal to the distance between the pivots 17 and 20 and between the pivots 20 and 23 so that the head of the frame 10 and the primary and secondary links will function as short chords of a circular arc.

The true arc is established by a bendable spline 37 preferably formed of a thin strip of spring steel which normally tends to assume a flat or straight position as illustrated in Fig. 1. This spline has horizontal slots 38 formed therein at intervals opposite the various pivots. At the pivots there are forwardly extending blocks 39 presenting arcuate forward surfaces 40, the centers of curvature of which are coincident with the axes of their respective pivots. These arcuate surfaces provide spaced bearing points against which the rear side of the spline 37 will bear. The spline may be retained against these bearing points by means of headed pins 41, the heads of which bear against the forward side of the spline across the slots 38 and the shanks of which are anchored in the blocks 39. The heads of these pins serve to retain the spline in bearing engagement with the bearing points afforded by the arcuate surfaces 40 so that as the links are swung relatively to the frame and to each other as indicated by dotted lines on Fig. 3, the spline will be correspondingly bent into the arc of a circle. Geometrically speaking, as the links of the chords established by the distances between the pivot pins are equal and the angles between the various links or chords are likewise equal, the pivot pins will consequently have their centers on the arc of a true circle. The position of the spline is governed or controlled with relation to these pivot pins being merely spaced therefrom by a distance equal to the radius of curvature of the bearing surfaces 40. While the position of the spline is thus governed opposite the various pivot pins the spline will tend to bend or bow evenly between these points due to the springiness of the metal of which it is formed and thus conform throughout its length to the arc of a circle. The radius of the circle will of course vary from infinity wherein the spline is straight as illustrated in full lines in Figs. 1 and 3 to a relatively short radius as illustrated by dotted lines on Fig. 3, depending upon the adjustment of the nut or yoke 13 by means of the screw 11. In this manner a relatively wide degree of adjustment through relatively long radii is permissible.

As a means for retaining the ends of the spline in firm engagement with the endmost block 39, the endmost links, two of which are illustrated at 24 and 25, have ears 41 rigidly mounted thereon. These ears provide fulcrums 42 for levers 43 the rear ends of which are pivoted to links 44 at 45. These links in turn are pivoted as at 46 to ears 47 that are on the link 21 and which are rigid therewith. The arrangement is such as the spline is flexed and the links 24 and 25 turn about the pin 23 relative to the links 21 and 22 that the link 44 causes the lever 43 to swing outwardly about 42 as a center. Each lever carries a stem 47 extending through a slot in the spline and provided with a vertical roller equipped head 48 bearing on the forward side of the spline so that as the spline is bent the head 48 will tend to draw the end of the spline rearwardly with relation to the endmost block 39 as indicated by dotted lines on Fig. 3, thus maintaining the curvature of the spline in conformity with the arc of a circle on both sides of the endmost block 39.

As a means of indicating the radius of curvature of the arc to which the spline is bent, the screw 11 is preferably equipped with a miter gear 49 meshing with a corresponding miter gear on the underside of a dial 50 rotatable about a center 51 that is rigidly mounted on the body and which carries an index pointer 52. This dial may be graduated in terms of the length of the radius of curvature to which the spline is bent, and as the screw 11 rotates to advance or restrict the nut or yoke 13 the dial will be simultaneously rotated with relation to the index pointer 52 to thus indicate the radius of the arc of the spline to which the device has been adjusted.

The height of the spline is such as to extend downwardly beneath the lowermost links and pivot pins so that the bottom edge may be positioned directly on paper on a drawing board to form a guide against which an arc may be drawn or to enable the spline to be bent to conform to a drawn arc when it is desired to determine its radius of curvature as will be indicated on the dial 50.

The rollers 63 and 64 are rotatably mounted respectively on the lower ends of vertical posts 65 and 66. Their companion or opposed rollers, indicated at 67 and 68, are rotatably mounted on blocks or slides 69 that are slidable in the tops of the posts and are urged downwardly therein by means of compression springs 70 that are confined in the posts by means of plugs 71. In this manner the upper rollers 67 and 68 are urged by springs toward their respective lower rollers 63 and 64 so that the spline in effect is clamped between the rollers. The posts 65 and 66 are pivotally mounted for rotation about vertical axes by means of pivot bolts 72 which are on the ends of a head 73. Links 74 and 75 are pivotally connected to ears 76 on the posts and to the pintle of a central roller 77. This central roller is rotatably mounted on a holder 78 (see Fig. 5) that is urged toward the spline by means of a compression spring 79 so that the central roller 77 is continually urged toward the spline. The purpose of this construction is to cause the axes of the pairs of rollers on the posts to automatically conform or adjust themselves to the curvature of the spline. Thus, as illustrated in full lines on Fig. 3, the spline is shown as straight or as having an infinite radius of curvature. Under these circumstances the four rollers 63, 64, 67 and 68 should be in the same plane and should be rotatable about parallel axes. On the other hand, when the spline is curved, as illustrated in dotted lines on Fig. 3, the axes of rotation of the rollers 63 and 67 should converge toward the axes of rotation of the rollers 64 and 68. In other words, the axes of rotation of the two pairs of rollers should be coincident with the radius of curvature to which the spline is bent. This automatic adjustment of the rollers is accomplished by the central roller 77 which bears on the forward face of the spline. When the spline is straight the spring 79 is effective to extend the roller 77 the greatest distance in which case the links 74 and 75 connected thereto and to the posts swing the posts into the full line position shown in Fig. 3. On the other hand when the spline is bent it is convex between the pairs of rollers so that the central roller 77 is caused to recede in the head 73 a short distance and thus actuate the links 74 and 75 to turn the posts on their pivot bolts 72 into the dotted line position as illustrated in Fig. 3. In this manner it will be appreciated that the rollers are automatically adjusted on adjusting the curvature of the spline so that the pairs of rollers will be rotatable about axes coincident with the radius of curvature of the spline. Consequently, with this arrangement the head 73 can freely and easily roll on the spline regardless of the position to which the spline has been adjusted. Adjustment of the spline automatically adjusts the central roller 77 which, in turn, automatically adjusts the posts on which the pairs of rollers are mounted. As the rollers 63, 64, 67 and 68 are grooved and the upper rollers are urged toward the lower rollers continually these rollers tend to center themselves with relation to the edges of the spline.

Figure 6:
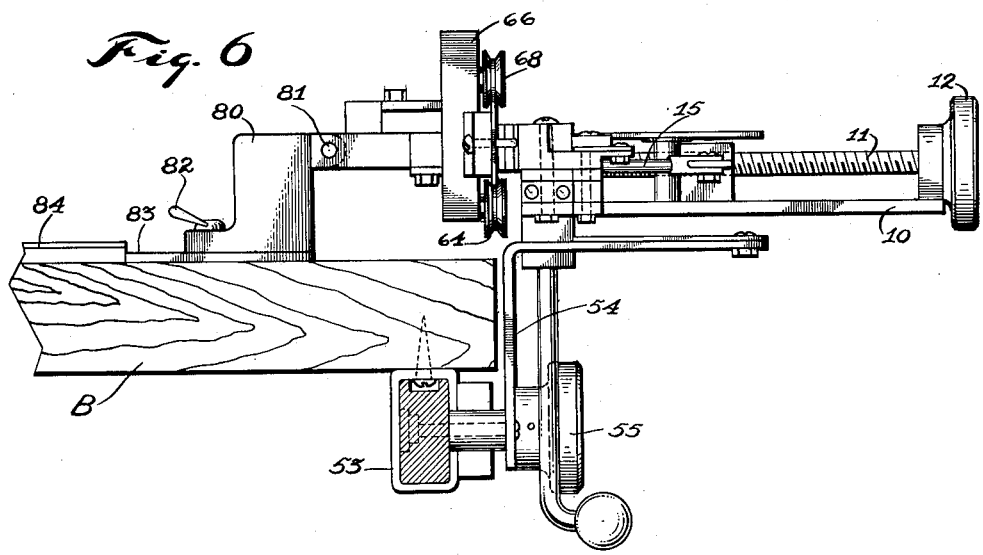
Fig. 6 is an end view in elevation of the structure illustrated in Fig. 3.
Figure 7:
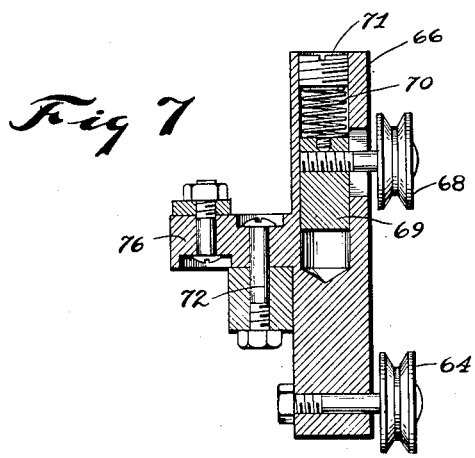
Fig. 7 is a vertical section taken substantially upon the line 7—7 upon Fig. 4.

The head 73 has a fitting 80 pivotally connected thereto as at 81 (see Fig. 6) and this fitting carries a clamp 82 to which an arm 83 may be detachably connected and which is designed to rest flatly on the top surface of the board B. A suitable scale 84 may be applied to this arm and is slidable along the length thereof. Triangles or other drawing instruments may be positioned against this scale in drawing the perspective.

In the use of the device as above described there are preferably two perspective machines employed, one being attached to one side of the drawing board and another attached to the opposite side of the drawing board. These machines may be adjusted about the clamp 56 as a center to the desired angles of perspective. The splines may then be adjusted so that their centers of curvature are representative of the desired vanishing points. When these adjustments have been made the draftsman may develop his perspective from the rule 84 on the arm 83 and it will be appreciated that in the course of swinging the arm 83 the head 73 of the carriage will progress along the length of the spline and will be positioned thereby so that regardless of the position assumed by the roller, any line drawn against the rule will lead toward the selected vanishing point as represented by the center of curvature of the spline.

In Figs. 8 to 14, inclusive, an alternative form of perspective machine is disclosed wherein there is a generally T-shaped frame indicated generally by the reference character 90. Within this frame there is rotatably mounted a screw 91 rotatable by means of a handle 92. This screw has threaded thereon a nut 93 on the bottom of which there is a rib that is slidable in a slot 94 in the bottom of the frame to hold the nut against rotation sympathetically with the screw. On the top of the nut there is an index or pointer 95 arranged to traverse a scale 96 on the top of the frame that is calibrated to indicate the radius of curvature of the spline. Links 97 and 98 are pivotally connected to the sides of the nut 93 so as to be drawn inwardly thereby when the screw is rotated by its handle to advance the nut in this direction. At the center of the frame there is an aperture that slidably receives a pin 99 which is anchored at its outer end to the center of the bendable spline 100. This spline, as previously described, is preferably formed of spring steel possessing a high degree of resiliency and the connection between the spline and the pin 99 is intended to prevent lateral movement of the spline relatively to the frame 90 while permitting the center of the spline to move toward and away from the frame as is required in bending the spline. Compare Figs. 8 and 13. At the ends of the frame 90 there are pivotally mounted thereon links 101 and 102 by means of pivot bolts 103 and 104. These links carry ears to which the links 97 and 98 are pivotally connected so that as the nut 93 is drawn inwardly by means of the screw 91 the links 97 and 98 will cause the links 101 and 102 to swing about their pivot bolts 103 and 104 to assume angular positions with relation to the frame as illustrated on Fig. 13. Conversely, if the screw is reversely rotated to force the nut 93 outwardly, these links 97 and 98 will transmit the motion to the links 101 and 102 to swing them into a position in alignment with the ends of the frame, allowing the spline 100 to assume a straight position as illustrated in Fig. 8. On the pivot bolts 103 and 104 there are mounted guide blocks 105 and 106. These guide blocks can turn with relation to the pivot bolts and present forward surfaces concentric with respect to their axes of turning which is coincident with the axes of their respective pivot bolts. On this outer or forward concentric surface each block 105 and 106 presents a rib 107 that extends through a slot 108 in the spline.

Retaining bolts 109 extend through the guide blocks and through their respective ribs and are equipped with washers 110 that are capable of sliding on the forward face of the spline 100. Thus, while the forward concentric faces of the blocks 105 and 106 will position the spline 100 at these points, the spline is capable of some sliding movement relative thereto and, although the blocks may turn with relation to their pivot bolts 103 and 104, the distance of the spline from the centers of the pivot bolts is maintained constant. At the outer ends of the links 101 and 102 there are similar guide blocks 111 and 112, respectively, but these guide blocks are preferably tightly bolted to their respective links such as by bolts or the equivalent, indicated at 113. These guide blocks are similarly ribbed with the ribs extending through slots in the spline so as to be capable of supporting the spline and likewise present outer forward surfaces concentric with the centers of their securing bolts. In the case of these blocks, the spline largely rolls on the forward faces of the blocks although some sliding movement of the spline relatively thereto is permissible.

A short distance inward from each of the pivot bolts 103 and 104 there are additional pivots 114 and 115 for links 116 and 117. These links in turn are pivotally connected at 118 and 119 to levers 120 and 121 intermediate their ends. These levers are in turn pivoted to the links 101 and 102 at 122 and 123, respectively. They carry at their forward or outer ends, T-shaped heads 124 and 125 that extend through slots in the spline with the heads bearing against the forward side of the spline. The links 116 and 117 are preferably recessed, as illustrated on the drawing, to accommodate the heads of the pivots between the links 97 and 98, respectively, and their links 101 and 102. The primary purpose of links 116 and 117 is to form merely a direct connection between the pivots 114 and 115 and the pivots 118 and 119 on the levers.

With this arrangement, when the nut 93 is drawn inwardly by the screw, the motion of the nut is transmitted through links 97 and 98 to links 101 and 102 to swing these links relatively to the frame 90. During this swinging movement the pivots 122 and 123 on the links 101 and 102 will be swung about pivots 103 and 104 as centers. The links 116 and 117, however, are pivoted to the frame for swinging movement about pivots 114 and 115 that are slightly spaced from pivots 103 and 104 so that as the links 101 and 102 are swung relatively to the frame there will be a corresponding relative movement between links 116 and 117 and their respective links 101 and 102. This movement causes the levers 120 and 121 to swing relatively to the links 101 and 102, respectively, in the course of bending the spline. Thus, when the spline is straight or the forward sides of all of the guide blocks 105, 106, 111 and 112 are in the same straight line as illustrated in Fig. 8, the levers will have swung into a position wherein the heads 124 and 125 are in conformity therewith bearing on the forward side of the spline but allowing it to remain straight. On bending the spline into the position shown on Fig. 13, the levers 120 and 121 are swung outwardly, so as to bend the spline about the guide blocks 111 and 112 in conformity with a true arc of a circle. Beyond the heads 124 and 125 the spline is, of course, unstressed and is not bent. However, any portion of the spline between the two heads 124 and 125 can be utilized either as a beam compass or as an arcuate guide or track for the carriage and arm of a perspective machine. When used as a perspective machine the structure, as above described, has a clamping bolt 126 extending through the link 101 and through the top of a C clamp 127. This clamp has a tightening screw 128 adapted to tighten a shoe 129 against the bottom of the edge of a drawing board so that the entire structure may be shifted along the edge of the drawing board. The clamping screw carries a handle 130 which on rotation will tighten link 101 against the top of the C clamp 127 to hold it in any rotated adjusted position with relation to the C clamp. 131 indicates a protractor that is positioned on top of the drawing board and which is rigid with the C clamp and this protractor may be used to indicate the angle of perspective. The angle may be determined by straightening the spline over the protractor and reading the angle against the straightened spline or, if desired, the link 101 may carry an index or pointer arranged to traverse the protractor to indicate the angle.

A carriage is provided designed to roll along the spline 100 and this carriage is generally of a similar construction to that previously described consisting essentially of a head 132 on the ends of which there are pivotally mounted posts 133 and 134 for swinging movement about vertical axes. These posts each carry opposed pairs of rollers, the lower rollers being indicated at 135 and the upper rollers at 136, which are urged toward the lower rollers by means of compression springs 137. Links 138 and 139 are pivotally connected to the posts and to the carrier of a central roller 140 that is urged to engage the forward side of the spline such as by a spring 141. The curvature of the spline between the pairs of rollers on the posts 133 and 134 governs the position of the roller 140 and this position in turn is translated by links 138 and 139 to swing or turn the posts 133 and 134 so that the axes of rotation of the rollers on the posts is always coincident with radii of curvature of the spline through their respective posts. In this manner the rollers are always positioned with relation to the curved spline so that the carriage will roll freely thereon.

In this form of construction it is possible to lock the carriage in any adjusted position along the length of the spline and to this end a rubber shoe 142 is provided that can be advanced into frictional engagement with the forward side of the spline by means of a handle screw 143 mounted on the head 132. By advancing this shoe by means of the screw the carriage may be locked in any adjusted position and, conversely, on retracting the shoe the carriage is freed for rolling movement on the spline between the limits established by the heads 124 and 125. A fitting 144 is pivoted to the head 132 for swinging movement about a horizontal axis and the arm 145 may be mounted thereon. In this form of construction the arm 145 is capable of swinging relatively to the fitting 144 when the clamp 146 is loosened. The use of such a clamp and the ability to swing the arm 145 with relation to the fitting 144 is optional.

From the above described constructions it will be appreciated that an improved construction is devised for accurately bending a resilient spline to conform to an arc of a circle. The spline so bent may be used either as a beam compass or as a track for a perspective machine. The arrangement is such that the spline will be accurately bent to conform to the arc of a circle at any radius from infinity to a relatively short radius. We find it advantageous in a device of this character not to attempt to bend the spline to an arc having a radius of less than ten inches. However, in any position between a ten-inch radius and infinity the spline is held remarkably true to the arc of a circle and its radius may be instantly read on the scale on the frame of the machine.

When used as a machine for drawing perspectives the device serves admirably to guide the arm of a scale or the arm of a T square through an arcuate path the center of which is representative of the vanishing point of the perspective. While the location of the center of curvature of the spline is variable, the adjustment of the rollers on the head of the carriage is automatically accomplished so that the carriage will freely roll thereon without binding.

Various changes may be made in the details of construction without departing from the spirit and scope of the invention as defined by the appended claims.

We claim:

1. A device of the class described comprising a frame, primary links pivotally connected to opposite sides of the frame for swinging movement relatively thereto, secondary links pivotally connected to the outer swinging ends of the primary links for swinging movement relatively thereto, means for simultaneously swinging the primary links equally relatively to the frame and causing the secondary links to swing relatively to the primary links in amounts equal to the movements of the primary links relatively to the frame, a bendable spline, bearing means at the pivotal connections between the primary links and the frame and between the secondary links and the primary links engageable with the spline and against which the spline may be bent to conform to the arc of a circle, and means engaging the ends of the spline for holding the spline against said bearing means.

2. A device of the class described comprising a frame, primary links pivotally connected to opposite sides of the frame for swinging movement relatively thereto, secondary links pivotally connected to the outer swinging ends of the primary links for swinging movement relatively thereto, means for simultaneously swinging the primary links equally relatively to the frame and causing the secondary links to swing relatively to the primary links in amounts equal to the movements of the primary links relatively to the frame, a bendable spline, bearing means at the pivotal connections between the primary links and the frame and between the secondary links and the primary links engageable with the spline and against which the spline may be bent to conform to the arc of a circle, levers pivotally mounted on the outer ends of the secondary links engageable with the forward face of the spline to hold the spline against the bearing means, and means for swinging said levers outwardly as the primary links and secondary links swing in bending the spline.

3. A device of the class described comprising a frame, links pivotally connected to opposite sides of the frame for swinging movement relatively thereto, means for simultaneously swinging the links equally relatively to the frame, a bendable spline, bearing means at the pivotal connections between the links and the frame and at the outer ends of the links against which the spline may be bent to conform to the arc of a circle, means pivotally mounted upon said links adjacent their outer ends engageable with the forward face of the spline to hold the spline against the bearing means, and means for swinging the last-mentioned means outwardly relatively to said links as the links are swung relatively to the frame to bend the spline in conformity with the arc of a circle.

WILLIAM Q. SULLIVAN.
JOHN Q. SULLIVAN.

REFERENCES CITED

The following references are of record in the file of this patent:

UNITED STATES PATENTS

| Number | Name | Date |
|---|---|---|
| 453,332 | Wright | June 2, 1891 |
| 495,157 | Johnson | Apr. 11, 1893 |
| 677,349 | Gagarin | July 2, 1901 |
| 1,061,345 | Weston | May 13, 1913 |
| 1,797,842 | Schmieder | Mar. 24, 1931 |
| 1,900,500 | Hinckelman | Mar. 7, 1933 |
| 2,116,563 | Danielson | May 10, 1938 |
| 2,491,330 | Petre | Dec. 13, 1949 |
| 2,522,030 | Fugua | Sept. 12, 1950 |

FOREIGN PATENTS

| Number | Country | Date |
|---|---|---|
| 10,573 | Germany | Sept. 8, 1880 |
| 136,446 | Germany | Nov. 28, 1902 |
| 243,249 | Germany | Feb. 7, 1912 |
| 325,259 | Germany | Sept. 11, 1920 |